United States Patent

Kanno et al.

[11] Patent Number: 5,420,721
[45] Date of Patent: May 30, 1995

[54] LENS BARREL

[75] Inventors: Hideo Kanno, Chiba; Kunihiro Fukino, Fujisawa; Hideshi Naito, Tokyo; Yoshiro Kodaka, Kawasaki, all of Japan

[73] Assignee: Nikon Corporation, Tokyo, Japan

[21] Appl. No.: 170,991

[22] Filed: Dec. 21, 1993

Related U.S. Application Data

[63] Continuation of Ser. No. 74,731, Jun. 10, 1993, abandoned, which is a continuation of Ser. No. 724,169, Jul. 1, 1991, abandoned.

[30] Foreign Application Priority Data

Jul. 3, 1990 [JP] Japan .................. 2-174511
Mar. 14, 1991 [JP] Japan .................. 3-073764

[51] Int. Cl.6 ............................. G02B 15/14
[52] U.S. Cl. ............................. 359/697; 359/698; 359/699; 359/823; 354/195.12; 354/402
[58] Field of Search .................. 359/694–706, 359/819–826; 354/195.1, –195.12, 400, 402, 408

[56] References Cited

U.S. PATENT DOCUMENTS

| | | | |
|---|---|---|---|
| 4,239,357 | 12/1980 | Iida | 354/195.1 |
| 4,272,174 | 6/1981 | Terramoto et al. | 354/195.1 |
| 4,319,820 | 3/1982 | Oskowski et al. | 354/195.1 |
| 4,525,053 | 6/1985 | Shiokama et al. | 354/400 |
| 4,609,260 | 9/1986 | Kawai | 359/698 |
| 4,796,045 | 1/1989 | Hamanishi et al. | 354/400 |
| 4,845,521 | 7/1989 | Akashi | 354/400 |
| 4,890,132 | 12/1989 | Hama | 359/694 |
| 4,925,282 | 5/1990 | Kanno et al. | 359/694 |
| 4,985,723 | 1/1991 | Egawa et al. | 354/400 |

Primary Examiner—Loha Ben
Assistant Examiner—James Phan
Attorney, Agent, or Firm—Shapiro & Shapiro

[57] ABSTRACT

A lens barrel which can be easily switched between a manual focusing mode and an auto-focusing mode employs a motor as a drive power source for driving a switching apparatus for switching between an auto-focusing apparatus and a manual focusing apparatus. When a photographer supplies an external electrical signal, a switching operation from the auto-focusing apparatus to the manual focusing apparatus and vice versa can be performed in accordance with the forward/reverse rotational direction of the motor.

4 Claims, 9 Drawing Sheets

LENS BARREL

This is a continuation of application Ser. No. 074,731, filed Jun. 10, 1993, now abandoned, which is a continuation of application Ser. No. 724,169, filed Jul. 1, 1991, now abandoned.

BACKGROUND OF THE INVENTION

1. Field of the Invention

The present invention relates to a lens barrel having an auto-focusing apparatus and a manual focusing apparatus.

2. Related Background Art

Conventionally, in order to switch between an auto-focusing apparatus and a manual focusing apparatus, a photographer manually rotates or slides an external switching member to mechanically switch an internal switching mechanism.

However, when a photographer wants to select a manual focusing photographing mode so as to perform a photographing operation of an object which cannot be automatically focused or to perform an out-of-focus photographing operation according to a given photographing will, he or she must manually rotate or slide the external switching member, and it is difficult to perform a quick switching operation.

In a so-called "go home" photographing function, an arbitrary photographing distance is stored in advance in a lens, and the lens is driven to the arbitrary photographing distance after a photographing operation with another photographing distance. This function cannot be realized by a conventional method since a photographer must manually rotate or slide the switching member to mechanically drive the internal switching mechanism in the manual focusing mode although this function may be realized in the auto-focusing mode.

In place of the conventional method of mechanically driving the internal switching mechanism, an operation method of electrically driving the internal switching mechanism has been proposed. However, a method using a bistable type solenoid suffers from a large power consumption, and a battery is considerably consumed. Therefore, there is no easy, economic switching apparatus which can satisfy needs of a photographer.

SUMMARY OF THE INVENTION

In order to solve the above-mentioned problem, according to the present invention, there is provided a lens barrel which includes a focusing optical system, a holding cylinder for holding the focusing optical system, and moving the focusing optical system in an optical axis direction to perform focusing, a cam cylinder, which is pivotal about the optical axis, for moving the holding cylinder by the pivotal movement, manual operation means, which is pivotal by a manual operation, for pivoting the cam cylinder by the pivotal movement, auto-focusing drive means, automatic operation means, driven by the auto-focusing drive means, for pivoting the cam cylinder by the drive operation, and clutch means which can be displaced between first and second positions, for coupling the cam cylinder and the manual operation means when the clutch means is located at a first position, and for coupling the cam cylinder and a automatic operation means when the clutch means is located at the second position, wherein the lens barrel has a power source for driving the clutch means, and the power source comprises a motor.

According to the present invention, a motor is used as a drive power source for driving a switching apparatus for switching between an auto-focusing apparatus and a manual focusing apparatus. When a photographer supplies an external electrical signal, the electrical signal is transmitted to the motor, and the motor is rotated, thereby switching from the auto-focusing apparatus to the manual focusing apparatus or vice versa according to the forward/reverse rotational direction of the motor. In this case, power consumption can be relatively small.

DETAILED DESCRIPTION OF THE PREFERRED EMBODIMENTS

The first embodiment of the present invention will be described below with reference to FIGS. 1 to 4.

Figure 1:
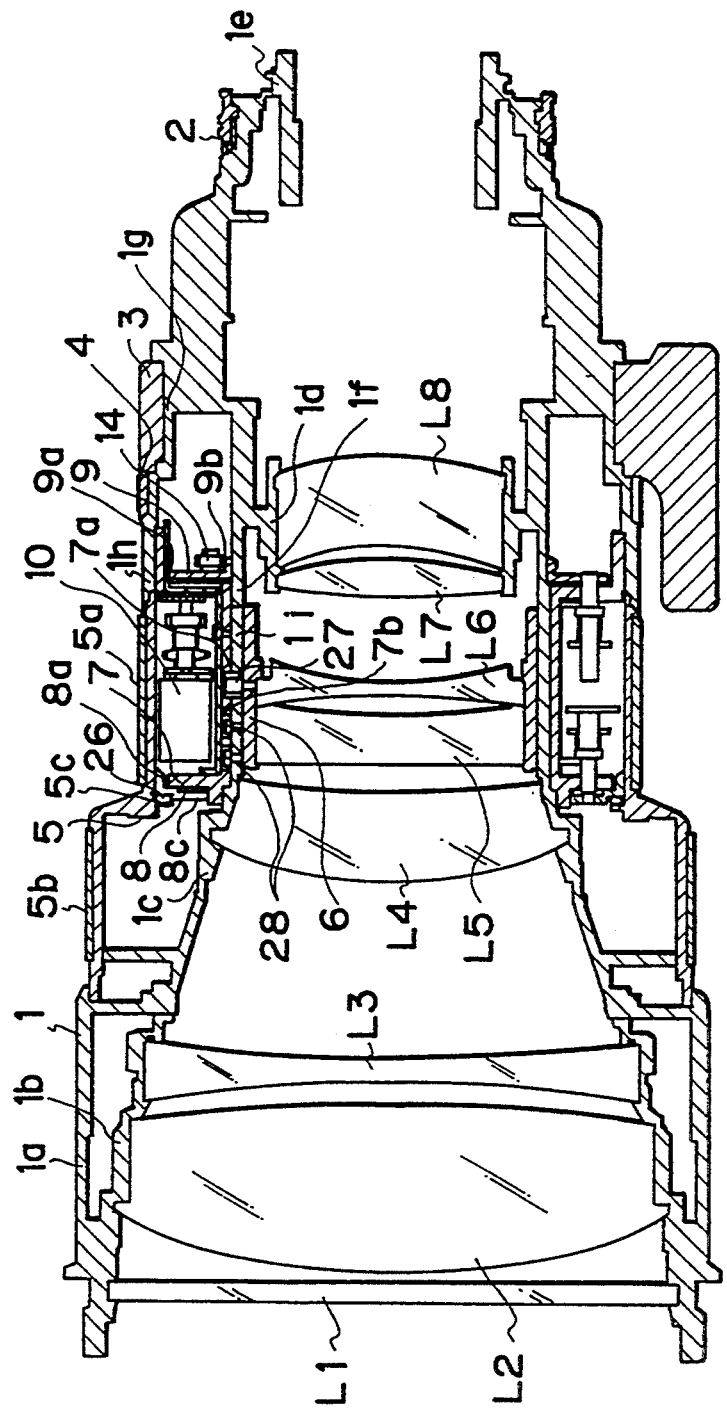
FIG. 1 is a sectional view of a lens barrel according to the first embodiment of the present invention taken along a plane containing the optical axis of the lens barrel.

FIG. 1 is a sectional view of the first embodiment of the present invention taken along a plane containing the optical axis thereof.

(Optical System)

A protection glass L1, stationary lenses L2, L3, and L4, focusing lenses L5 and L6, and stationary lenses L7 and L8 form an optical system.

(Structure)

A stationary lens barrel 1 is a stationary portion of a lens barrel, and has a large-diameter portion 1a, an inner peripheral portion 1b, a middle-diameter portion 1c, a small-diameter portion 1d, a mount portion 1e, a central small-diameter portion 1f, an outer peripheral portion 1g, a central outer peripheral portion 1h, and a guide groove 1i.

The protection glass L1 is held by the large-diameter portion 1a.

The stationary lenses L2 and L3 are held by the inner peripheral portion 1b.

The stationary lens L4 is held by the middle-diameter portion 1c on the right side of the portion 1b.

The stationary lenses L7 and L8 are held by the small-diameter portion 1d of the central portion.

The mount portion 1e formed on the right end of the barrel 1 can be engaged with a camera body (not shown). A diaphragm ring 2 is fitted on the outer circumferential surface of the mount portion 1e.

A tripod mount 3 is fixed to the outer peripheral portion 1g on the left side of the mount portion 1e, and a switching ring 4 is also fitted on the outer peripheral portion 1g.

A manual operation ring 5 is fitted on the central outer peripheral portion 1h on the left side of the portion 1g.

A movable frame 6 which holds the focusing lenses L5 and L6 is fitted in the inner circumferential surface of the central small-diameter portion 1f to be movable along the optical axis.

The guide groove 1i is formed in the central small-diameter portion 1f to be parallel to the optical axis.

The switching ring 4 is provided to select an auto-focusing mode or a manual focusing mode, and to perform a switching operation. The ring 4 can be rotated through a predetermined angle about the optical axis, and generates a corresponding electrical signal. The ring 4 supplies a signal indicating a rotational direction to a drive motor 10 via a CPU (not shown).

The manual operation ring 5 is fitted on the stationary lens barrel 1 to be immovable in the optical axis direction and to be rotatable about the optical axis. Rubber rings 5a and 5b are mounted on the outer circumferential surface of the ring 5 as anti-slide members. A wavy leaf spring 26 is interposed as a frictional clutch between a wall portion 5c of the inner circumferential surface of the manual operation ring 5 and a manual clutch ring 8. More specifically, in a normal state, when the manual operation ring 5 is rotated, the manual clutch ring 8 is simultaneously rotated. When the manual clutch ring 8 abuts against a rotation limit, and its rotation is stopped, the manual operation ring 5 idles.

A pin 27 stands upright on the outer circumferential surface of the movable frame 6, and extends through the guide groove 1i. The distal end portion of the pin 27 is fitted in a cam groove 7a formed in a cam ring 7. When the cam ring 7 is rotated, the movable frame 6 is moved linearly along the optical axis, thus performing a focusing operation.

The cam ring 7 is fitted on the central small-diameter portion 1f of the stationary lens barrel 1, and is formed with a circumferential groove 7b over a predetermined angle. Since a pin 28 standing upright on the central small-diameter portion 1f is fitted in the circumferential groove 7b of the cam ring 7, the cam ring 7 is immovable in the optical axis direction, and is rotatable about the optical axis through the predetermined angle.

The manual clutch ring 8 is fitted in and held by the inner circumferential surface of the manual operation ring 5 to be immovable in the optical axis direction, but to be rotatable about the optical axis.

Figure 4:
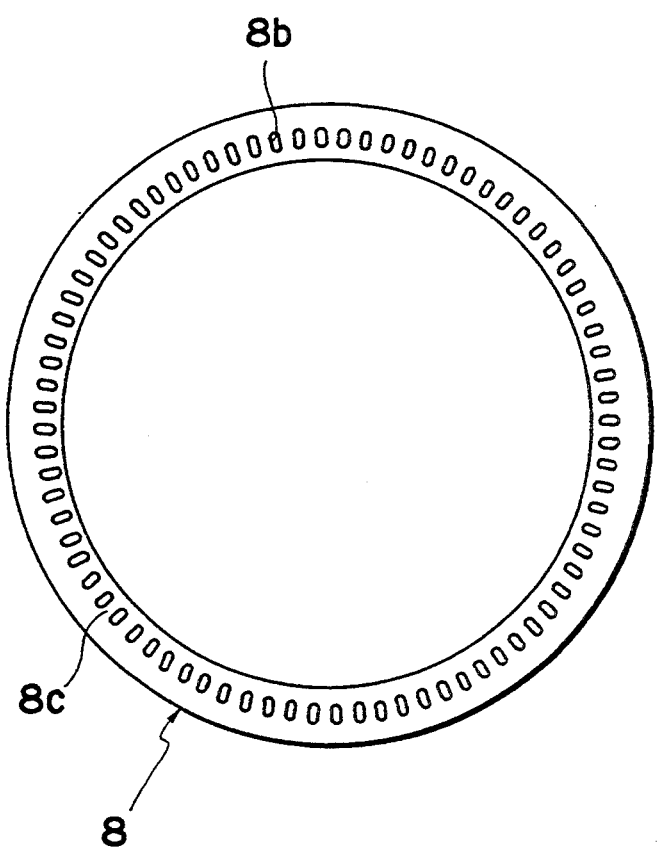
FIG. 4 is a plan view of a manual clutch ring of the first embodiment.

FIG. 4 is a plan view of the manual clutch ring 8. As shown in FIG. 4, a plurality of oval holes 8b are radially formed in a wall portion 8c of the manual clutch ring 8 along the circumference.

An automatic clutch ring 9 is fitted on and held by the central small-diameter portion 1f of the stationary lens barrel 1 to be immovable in the optical axis direction but to be rotatable about the optical axis. Oval holes 9c similar to the plurality of oval holes 8b radially formed in the wall portion 8c of the manual clutch ring 8 shown in FIG. 4 are formed in a wall portion 9a of the automatic clutch ring 9. A segment gear 9b is arranged inside a bent portion of the automatic clutch ring 9, and is meshed with a pinion gear 14. When the pinion gear 14 is rotated by an auto-focusing drive mechanism (not shown), the automatic clutch ring 9 is rotated about the optical axis via the segment gear 9b.

The drive motor 10 serves as a drive power source for the switching apparatus, and is fixed to the cam ring 7.

Figure 2:
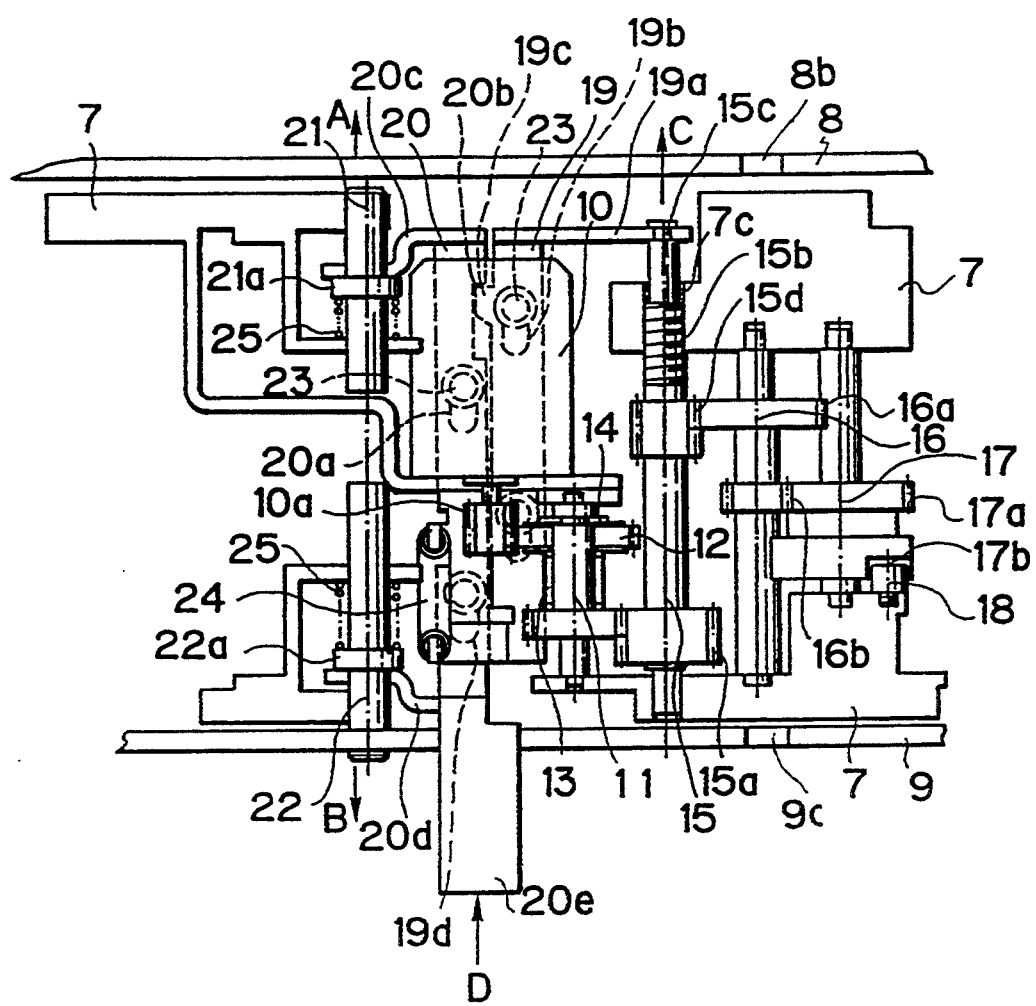
FIG. 2 is a sectional view showing a switching apparatus of the first embodiment in an auto-focusing mode.

FIG. 2 is a sectional view of the switching apparatus.

The drive motor 10 is fixed to the cam ring 7.

A gear 10a is fixed to a rotational shaft portion of the drive motor 10, and is meshed with a gear 12 which is rotated coaxially with a gear 11 axially supported by the cam ring 7. A compression spring 13 serving as a frictional clutch is interposed between the gears 11 and 12. Therefore, in a normal state, when the gear 12 is rotated, the gear 11 is coaxially rotated. However, when the rotation of the gear 11 is limited, the rotation of the gear 12 is not limited, and the drive motor 10 which is rotated together with the gear 12 via the gear 10a idles when the gear 11 is not rotated.

A large gear 15a of a gear 15 is meshed with the gear 11, a small gear 15d is meshed with a large gear 16a of a gear 16, and a small gear 16b coaxial with the large gear 16a is meshed with a large gear 17a of a gear 17, thus constituting a reduction gear train.

A circumferential groove 17b having a predetermined angle is formed in the end face of the gear 17, and is engaged with a rotation limit pin 18 standing upright on the cam ring 7. Therefore, the gears 11, 15, 16, and 17 can only be rotated by a corresponding numbers of revolutions. However, the rotation of the gear 12 is not limited, and the drive motor 10 can idle.

A threaded portion 15b is formed on a portion of the gear 15, and is threadably engaged with a threaded portion 7c formed on the cam ring 7. When the gear 15 is rotated by a predetermined number of revolutions, the gear 15 is moved by a predetermined amount along the optical axis.

A groove 15c is formed in the distal end portion on the side of the threaded portion 15b of the gear 15, and is engaged with an elongated portion 19a of a first clutch plate 19. Therefore, the gear 15 is movable integrally with the first clutch plate 19 in the optical axis direction.

An oval hole 19b elongated in the optical axis direction is formed in the first clutch plate 19. Thus, the first clutch plate 19 is engaged with the cam ring 7 via the oval hole 19b and a stepped small screw 23 to be integrally rotatable and to be movable by a predetermined amount in the optical axis direction. The first clutch plate 19 has the elongated portion 19a which is engaged with the groove 15c of the gear 15. Thus, the first clutch plate 19 is movable integrally with the gear 15 in the optical axis direction.

An oval hole 20a elongated in the optical axis direction is formed in a second clutch plate 20 like in the first clutch plate 19. Thus, the second clutch plate 20 is engaged with the cam ring 7 via the oval hole 20a and the stepped small screw 23 to be integrally rotatable and to be movable by a predetermined amount in the optical axis direction. A tension spring 24 is interposed between a bent portion 19d of the first clutch plate 19 and the second clutch plate 20 so as to bias them in a tensile direction. A projection portion 19c of the first clutch plate 19 is engaged with a groove portion 20b of the second clutch plate 20. In a normal state, the first and second clutch plates 19 and 20 are integrally movable.

An arm portion 20c of the second clutch plate 20 is in contact with a stepped portion 21a of a first clutch pin 21 which is fitted in the cam ring 7 to be movable in the optical axis direction, and blocks the first clutch pin 21 from being moved in a direction of an arrow A in FIG. 2 by the biasing force of a clutch spring 25.

An arm portion 20d is similarly formed on the end face of the second clutch plate 20 opposite to the arm portion 20c, and is in contact with a stepped portion 22a of a second clutch pin 22 which is fitted in the cam ring 7 to be movable in the optical axis direction. The arm portion 20d blocks the second clutch pin 22 from being moved in a direction of an arrow B in FIG. 2 by the biasing force of the clutch spring 25.

(Operation)

An operation of the apparatus will be described below.

Figure 3:
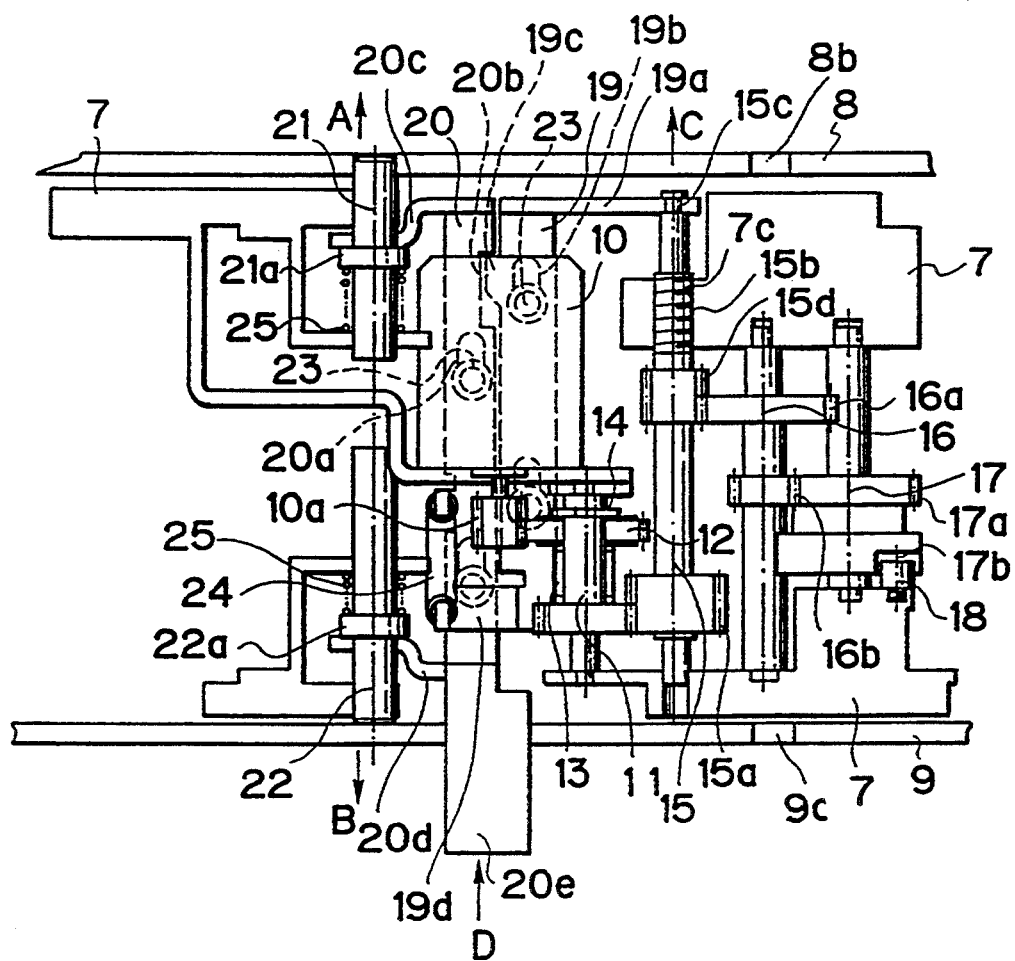
FIG. 3 is a sectional view showing the switching apparatus of the first embodiment in an auto-focusing mode.

FIG. 2 is a sectional view in a state of the auto-focusing mode, and FIG. 3 is a sectional view in a state of the manual focusing mode.

The second clutch pin 22 is fitted in one of the plurality of oval holes 9c radially formed in the wall portion 9a of the automatic clutch ring 9. However, the first clutch pin 21 is not engaged with the oval holes 8b radially formed in the wall portion 8c of the manual clutch ring 8. When the pinion gear 14 is rotated by the auto-focusing drive mechanism (not shown), the automatic clutch ring 9 is rotated since it has the segment gear 9b.

Since the second clutch pin 22 is fitted in one of the oval holes 9c of the automatic clutch ring 9, the cam ring 7 is also simultaneously rotated. As stated earlier, the pin 27 stands upright on the outer circumferential surface of the movable frame 6, and extends through the guide groove 1i formed in the stationary lens barrel 1 to be parallel to the optical axis, and its distal end portion is fitted in the cam groove 7a formed in the cam ring 7. Therefore, when the cam ring 7 is rotated, the movable frame 6 which holds the focusing lenses L5 and L6 is linearly moved along the optical axis, thus performing a focusing operation.

In this case, since the first clutch pin 21 is not engaged with the oval holes 8b of the manual clutch ring 8, the manual clutch ring 8 is not rotated.

Figure 5:
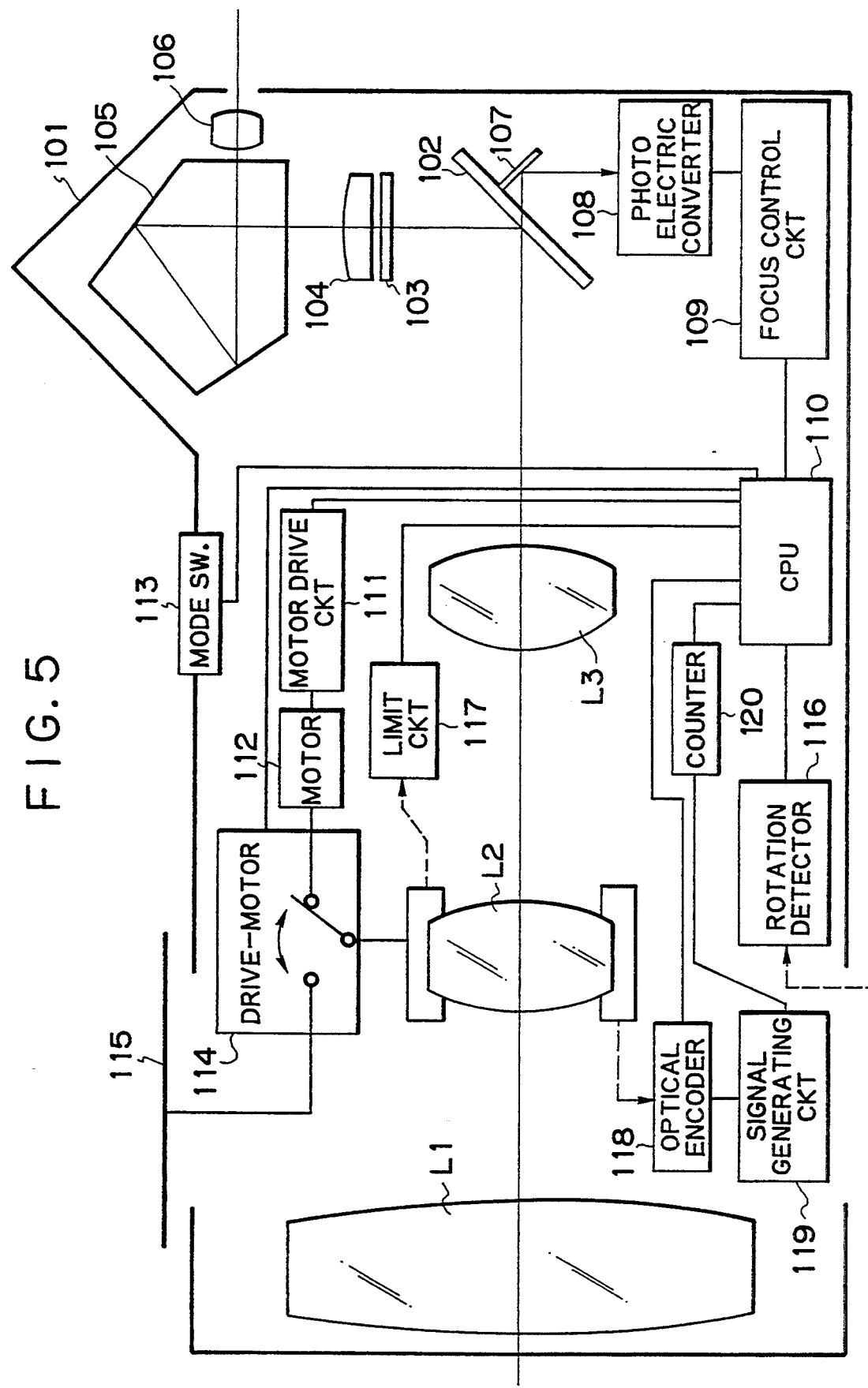
FIG. 5 is a schematic view showing a system as a combination of a camera and a lens of the first embodiment.

The operation of this embodiment will be described in detail below with reference to FIG. 5 showing a schematic view of a system as a combination of a camera and a lens.

In this embodiment, as photographing modes associated with a focusing operation, the following three modes can be arbitrarily selected by a mode switch 113.

① Manual Focusing (MF) Mode
② Auto-focusing (AF) Mode
③ MF Priority AF Mode

The respective modes will be explained below in turn.

The MF mode will be described below.

When the MF mode is selected by the mode switch 113 (corresponding to the switching ring 4 in FIG. 1) which can be externally operated, a signal indicating the MF mode is output to a CPU 110 in the lens. The CPU 110 rotates a drive motor 114 to be ready for transmitting a rotation of a distance operation ring 115 (corresponding to the manual operation ring 5 in FIG. 1) to a focusing optical system L2 (corresponding to the lenses L4 to L6 in FIG. 1). More specifically, when the switching ring 4 is rotated in FIG. 2 to select the MF mode, the drive motor 10 is rotated. When the drive motor 10 is rotated, the gear 12 meshing with the gear 10a fixed to the rotational shaft portion of the drive motor 10 is rotated. Since the compression spring 13 is interposed between the gears 11 and 12 and serves as a frictional clutch, the gear 11 is rotated upon rotation of the motor 10. Then, the gear 17 is rotated via a gear train consisting of the gears 11, 15, 16, and 17. Since the groove 17b formed in the end face of the gear 17 is engaged with the rotation limit pin 18 projecting on the cam ring 7, the gears 11, 15, 16, and 17 are rotated by the predetermined number of revolutions. Since the threaded portion 15b of the gear 15 and the threaded portion 7c of the cam ring 7 are threadably engaged with each other, when the gear 15 is rotated by the predetermined number of revolutions, the gear 15 is moved by a predetermined amount in a direction of an arrow C in FIG. 2 along the optical axis while being rotated. Since the groove 15c formed in the distal end portion on the side of the threaded portion 15b of the gear 15 is engaged with the elongated portion 19a of the clutch plate 19, the clutch plate 19 and the gear 15 are integrally moved in the optical axis direction. Since the projection portion 19c of the clutch plate 19 is in contact with the groove portion 20b of the second clutch plate 20, and the first and second clutch plates 19 and 20 are integrally movable in a normal state, the clutch plates 19 and 20 are integrally moved in the direction of the arrow C in FIG. 2.

When the second clutch plate 20 is moved in the direction of the arrow C in FIG. 2, the arm portion 20c of the second clutch plate 20 is in contact with the stepped portion 21a of the first clutch pin 21, and the first clutch pin 21 is moved in the direction of the arrow A in FIG. 2 by the biasing force of the clutch spring 25, and is engaged with one of the oval holes 8b of the manual clutch ring 8. As a result, the manual clutch ring 8 and the cam ring 7 can be integrally rotated.

More specifically, when the angular positions of the first clutch pin 21 and one of the oval holes 8b of the manual clutch ring 8 coincide with each other, the first clutch pin 21 is immediately engaged with one of the oval holes 8b of the manual clutch ring 8.

If the angular positions of the first clutch pin 21 and one of the oval holes 8b of the manual clutch ring 8 do not coincide with each other, and the distal end of the first clutch pin 21 is in contact with the wall portion 8c of the manual clutch ring 8, the manual clutch ring 8 is rotated upon rotation of the manual operation ring 5. Thus, when the angular positions of the first clutch pin 21 and one of the oval holes 8b of the manual clutch ring 8 coincide with each other, the first clutch pin 21 is engaged with one of the oval hole 8b of the manual clutch ring 8.

On the other hand, the arm portion 20d of the second clutch plate 20 is in contact with the stepped portion 22a of the second clutch pin 22, and the second clutch pin is fitted in one of the oval holes 9c of the automatic clutch ring 9 by the biasing force of the clutch spring 25. At this time, since the first and second clutch plates 19 and 20 are integrally moved in the direction of the arrow C in FIG. 2, the arm portion 20d of the second clutch plate 20 is also moved, and at time same time, the second clutch pin 22 is moved. As a result, the second clutch pin 22 is disengaged from one of the oval holes 9c of the automatic clutch ring 9.

Therefore, even when the cam ring 7 is rotated, the automatic clutch ring 9 is not rotated. This state is a state in the MF mode. FIG. 3 shows the state of the apparatus at this time. A photographer performs a manual focusing operation by rotating the distance operation ring 115 while viewing through a finder eyepiece lens 106. In this case, the operation of a focus control circuit 109 is inhibited.

As described above, the focusing optical system L2 (FIG. 5) is driven in the MF mode, and an in-focus state for a desired object can be obtained by the manual operation of a photographer.

The AF mode will be described below.

When the AF mode is selected by the mode switch 113 which can be externally operated, a signal indicating the AF mode is output to the CPU 110 in the lens. The CPU 110 rotates the drive motor 114 in a direction opposite to that in the MF mode to be ready for transmitting a drive force of a motor 112 to the focusing optical system L2 (FIG. 5). More specifically, referring to FIG. 3, when the switching ring 4 is rotated to switch the photographing mode from the MF mode to the AF mode, the drive motor 10 is rotated in the reverse direction. When the motor 10 is rotated in the reverse direction, the gear train, i.e., the gears 12, 11, 15, 16, and 17, which are meshed with the gear 10a fixed to the rotational shaft portion of the drive motor 10, are rotated in the opposite direction by the predetermined numbers of revolutions. Since the threaded portion 15b of the gear 15 and the threaded portion 7c of the cam ring 7 are threadably engaged with each other, the gear 15 is rotated in the opposite direction by the predetermined number of revolutions. The gear 15 is moved along the optical axis by a predetermined amount in a direction opposite to the arrow C in FIG. 2 while being rotated. Since the groove 15c formed in the distal end portion on the side of the threaded portion 15b of the gear 15 is engaged with the elongated portion 19a of the first clutch plate 19, the first clutch plate 19 and the gear 15 are integrally moved in the optical axis direction.

When the first clutch plate 19 is moved by the predetermined amount in the direction opposite to the arrow C in FIG. 2, since the tension spring 24 is interposed between the bent portion 19d of the first clutch plate 19 and the second clutch plate 20, the first and second clutch plates 19 and 20 are integrally moved in the direction opposite to the arrow C in FIG. 2. When the second clutch plate 20 is moved in the direction opposite to the arrow C in FIG. 2, the arm portion 20d of the second clutch plate 20 is in contact with the stepped portion 22a of the second clutch pin 22, and the second clutch pin 22 is moved in the direction of the arrow B in FIG. 2 by the biasing force of the clutch spring 25, and is engaged with one of the oval holes 9c radially formed in the wall portion 9a of the automatic clutch ring 9. As a result, the automatic clutch ring 9 and the cam ring 7 can be integrally rotated.

When the angular positions of the second clutch pin 22 and one of the oval holes 9c of the automatic clutch ring 9 coincide with each other, the second clutch pin 22 is immediately engaged with one of the oval holes 9c of the automatic clutch ring 9.

If the angular positions of the second clutch pin 22 and one of the oval holes 9c of the automatic clutch ring 9 do not coincide with each other, and the distal end of the second clutch pin 22 is in contact with the wall portion 9a of the automatic clutch ring 9, the automatic clutch ring 9 is rotated by the auto-focusing drive mechanism. Thus, when the angular positions of the second clutch pin 22 and one of the oval holes 9c of the automatic clutch ring 9 coincide with each other, the second clutch pin 22 is engaged with this oval hole 9c of the automatic clutch ring 9.

On the other hand, the arm portion 20c of the second clutch plate 20 is in contact with the stepped portion 21a of the first clutch pin 21, and the first clutch pin 21 is fitted in one of the oval holes 8b of the manual clutch ring 8 by the biasing force of the clutch spring 25. In this case, since the first and second clutch plates 19 and 20 are integrally moved in the direction opposite to the arrow C in FIG. 2, the arm portion 20a of the second clutch plate 20 is moved, and at the same time, the first clutch pin 21 is moved. Therefore, the first clutch pin 21 is disengaged from one of the oval holes 8b of the manual clutch ring 8.

Therefore, when the cam ring 7 is rotated, the manual clutch ring 8 is not rotated. This state corresponds to a state in the AF mode. FIG. 2 shows the state of the apparatus in this case.

In FIG. 5, light reflected by an object reaches a half mirror 102 of a camera body 101 via a photographing lens, and some components of the light form an object image on a focusing screen 103. The object image is guided to a photographer's eye via a condenser lens 104, a pentagonal prism 105, and the finder eyepiece lens 106.

Some light components passing through the half mirror 102 are reflected by a sub mirror 107, and guided to a distance measurement photoelectric converter 108. An output signal from the photoelectric converter 108 is input to the known focus control circuit 109, and the circuit 109 determines a drive direction and a drive amount of the focusing optical system L2. These drive signals are supplied to the CPU 110 in the lens. The CPU 110 drives the motor 112 via a motor driver 111 until the above-mentioned drive amount is obtained. Upon completion of the drive operation, a focusing state is detected again, and when an in-focus state cannot be detected, the above-mentioned operation is repeated until an in-focus state is attained.

An optical encoder 118 is attached to the focusing optical system L2, and generates a sine wave signal upon movement of the optical system. The sine wave signal from the encoder 118 is input to a signal forming circuit 119, and is then output as a pulse signal. The pulse signal from the signal forming circuit 119 is counted by a counter 120, thereby monitoring the movement of the focusing optical system L2.

A limit circuit 117 is arranged in a rotation limit portion of the cam ring 7. When the focusing optical system L2 reaches the infinity or closest position, the circuit 117 outputs a signal to the CPU 110 of the lens barrel, thereby reversing the driving direction of the focusing optical system L2.

The focusing optical system L2 is driven in the AF mode as described above, and an in-focus state for a desired object can be obtained.

The MF priority AF mode will be described below. When the MF priority AF mode is selected by the mode switch 113 which can be externally operated, a signal indicating the MF priority AF mode is output to the CPU 110 in the lens. The CPU 110 sets the same state as in the AF mode, i.e., a state wherein the drive motor 114 is rotated in the same direction as in the AF mode to be ready for transmitting a drive force of the motor 112 to the focusing optical system L2.

When a photographer wants to select the MF mode due to, e.g., a focusing disabled state during an AF operation, he or she performs an MF operation, i.e., rotates the distance operation ring 115 without using the mode switch 113. Then, a rotation detection device 116 detects the rotation of the distance operation ring 115, and outputs a signal indicating this to the CPU 110 in the lens. Upon reception of the signal, the CPU 110 immediately operates the drive motor 114 to set the same state as in the MF mode. That is, the operation of the focus control circuit 109 is inhibited, and the rotation of the distance operation ring 115 can be transmitted to the focusing optical system L2. In this manner, a photographer can immediately perform an MF operation without an MF-AF switching operation using the mode switch 113.

In the MF priority AF mode, as a method of restoring an AF state from an MF state, the following methods may be adopted. In one method, a signal for restoring the AF state from the MF state is output from the CPU 110 in the lens a predetermined period of time after generation of a pivot signal of the MF operation ring is stopped, thereby reversing the drive motor 114 to operate a clutch mechanism. In another method, a signal generated in response to the second stroke of a release button of the camera body is output to the CPU in the lens, and the drive motor 114 is reversed on the basis of this signal, thereby operating the clutch mechanism.

As described above, according to this embodiment, when the MF priority AF mode is selected by the mode switch 113, if the MF ring is pivoted even during the AF operation, the MF state can be set without a special switching operation. Therefore, a normal photographing operation can be performed in the AF mode, and a photographing operation for an object which is not easy to focus or an intentional out-of-focus photographing operation can be smoothly performed in the MF mode by operating the MF ring, thus improving operability.

When an electrical switching operation is disabled since a battery for the drive motor 10 is consumed and a drive power supply voltage is decreased, or when the lens of this embodiment is attached to a camera body having no auto-focusing apparatus, the switching ring 4 is rotated to mechanically push an elongated portion 20e of the second clutch plate 20 in a direction of an arrow D in FIG. 2. Then, the first clutch plate 19 is not moved, and only the second clutch plate 20 is moved in the direction of the arrow D. As a result, the clutch pins 21 and 22 are operated to the same state as in a state wherein the mode is switched from the AF mode to the MF mode, and the clutch pin 21 is engaged with the manual clutch ring 8. When the clutch pin 21 is to be disengaged from the manual clutch ring 8, the switching ring 4 can be rotated to cancel the pushing force of the elongated portion 20e of the second clutch plate 20, so that only the second clutch plate 20 is returned to an original position by the biasing force of the tension spring 24.

(Second Embodiment)

The second embodiment of the present invention will be described below with reference to FIGS. 6 and 7.

Figure 6:
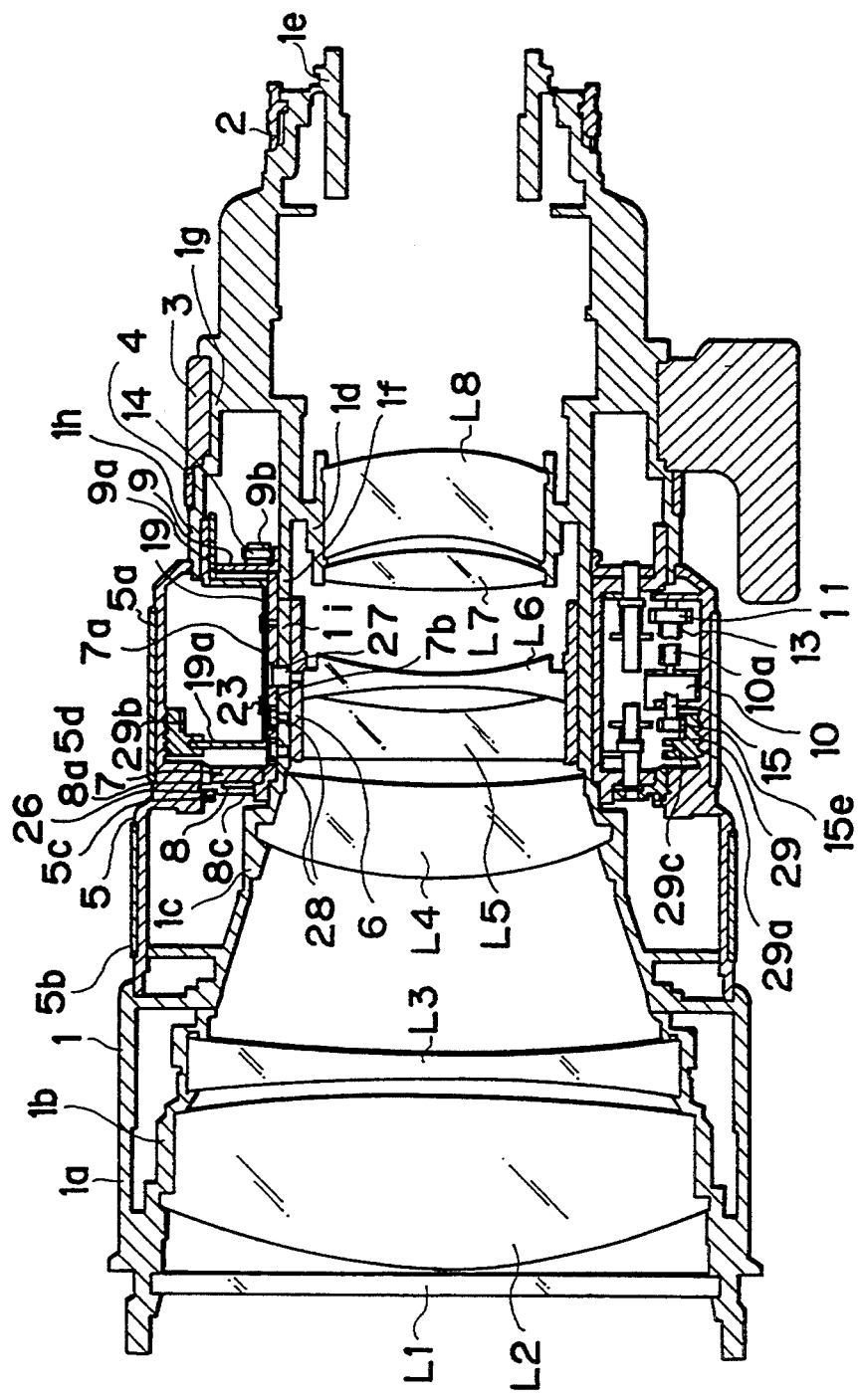
FIG. 6 is a sectional view of a lens barrel according to the second embodiment of the present invention taken along a plane containing the optical axis of the lens barrel.

FIG. 6 is a sectional view of the second embodiment taken along a plane containing the optical axis.

(Optical System)

Since an optical system of this embodiment is the same as that in the first embodiment, a description thereof will be omitted.

(Structure)

Only a difference in structure from the first embodiment will be described below. The same reference numerals denote the parts common to those in the first embodiment.

A switching ring 29 is threadably engaged with the inner circumferential surface of a manual operation ring 5 by helicoidal screws 5d and 29a. An internal gear 29b and a groove portion 29c are formed on the inner circumferential surface of the switching ring 29 over the entire circumference. The internal gear 29b is meshed with a small gear 15e, and an elongated portion 19a of a first clutch plate 19 is fitted in the groove portion 29c.

Figure 7:
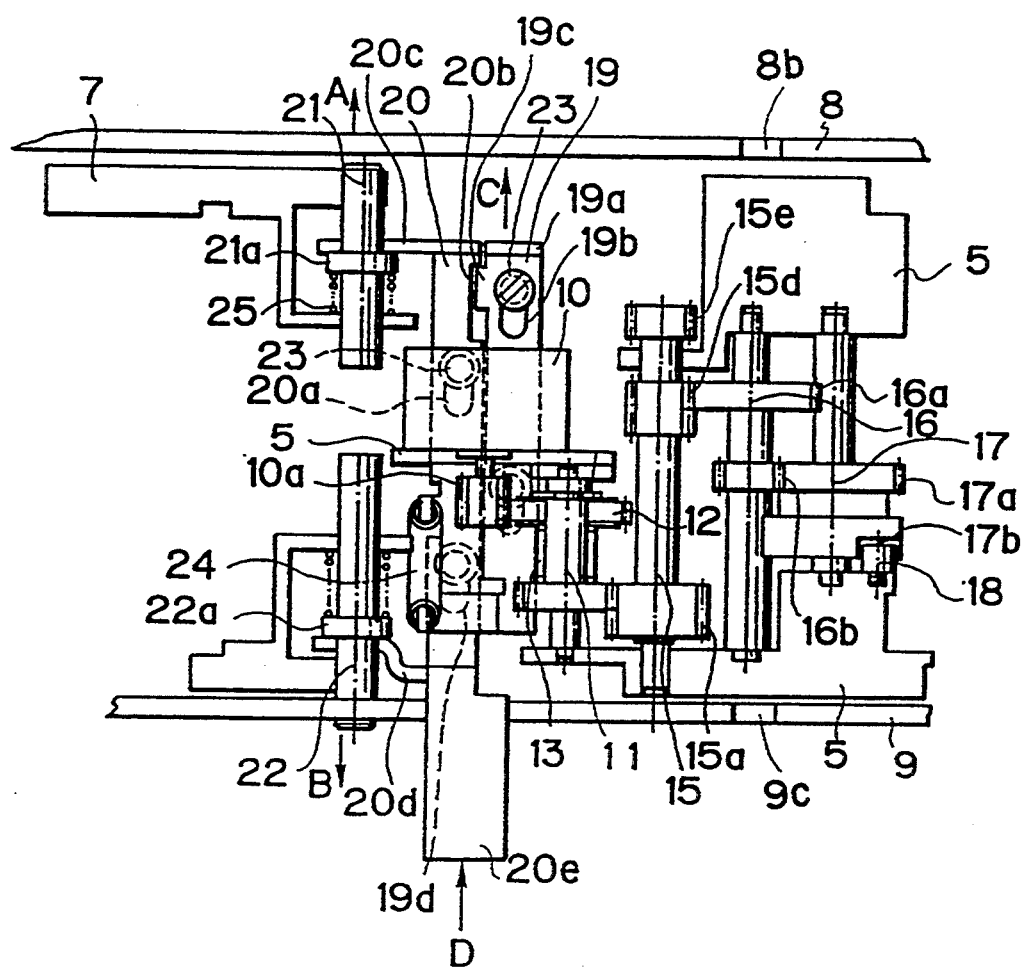
FIG. 7 is a sectional view of a switching apparatus of the second embodiment.

FIG. 7 is a sectional view of a switching apparatus according to the second embodiment of the present invention.

The structures of a drive motor 10, gears 11 and 12, a compression spring 13, gears 15, 16, and 17, a rotation limit pin 18, and the like are the same as those in the first embodiment. In the second embodiment, however, these components are arranged on the inner circumferential surface of the manual operation ring 5.

The operation of this embodiment will be described below. In this embodiment, substantially the same operation as in the first embodiment is performed except for a moving method of the first clutch plate 19. More specifically, when the drive motor 10 is rotated, the gear 15 is rotated through a gear 10a, and the gears 12 and 13, and the switching ring 29 is rotated through the gear 15e and the internal gear 29b. The switching ring 29 is moved in the optical axis direction by the helicoidal screws 29a and 5d. Since the elongated portion 19a of the first clutch plate 19 is fitted in the groove portion 29c of the switching ring 29, the first clutch plate 19 is moved integrally with the switching ring 29 in the optical axis direction.

(Third Embodiment)

The third embodiment of the present invention will be described below with reference to FIGS. 8 and 9.

Figure 8:
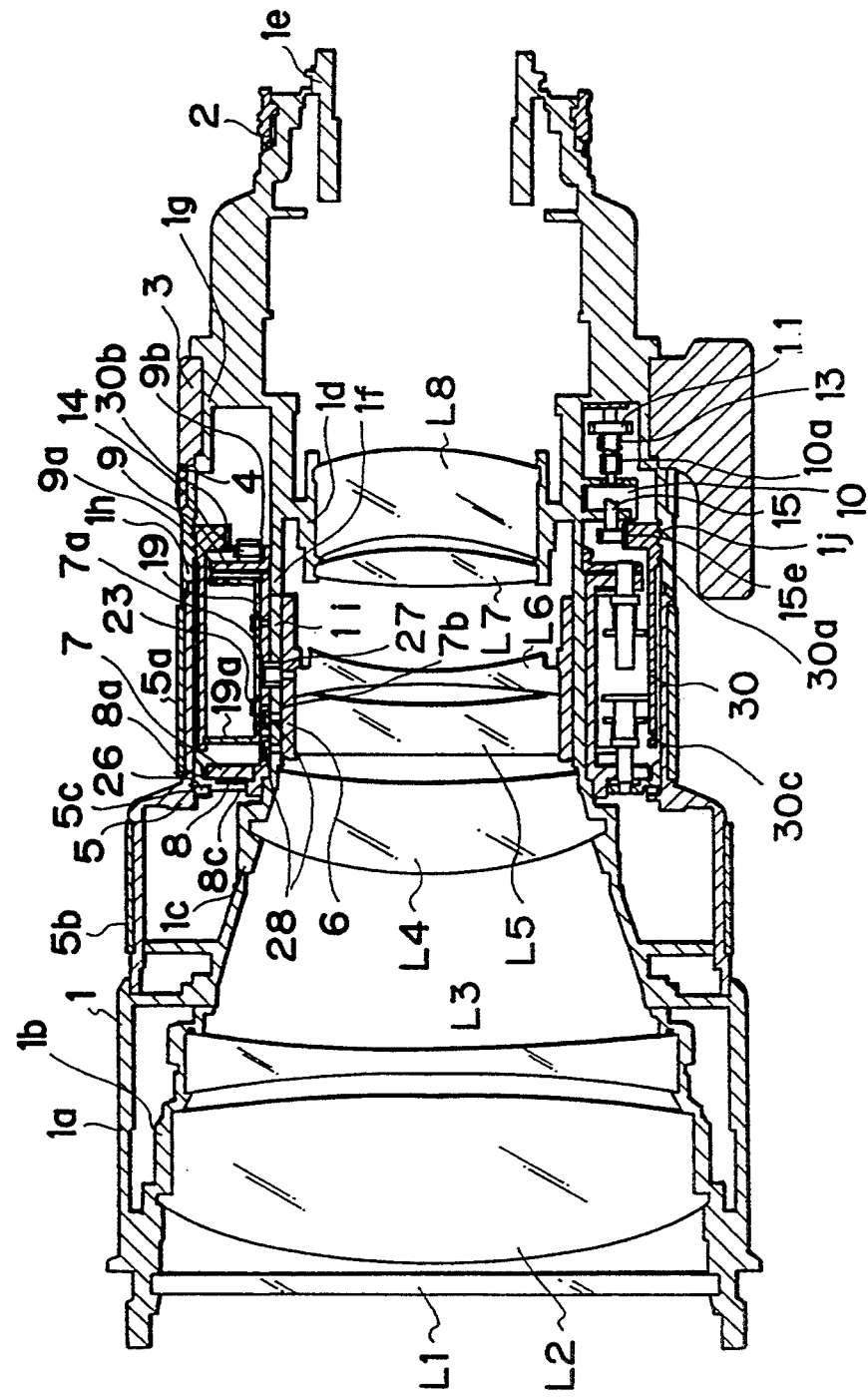
FIG. 8 is a sectional view of a lens barrel according to the third embodiment of the present invention taken along a plane containing the optical axis of the lens barrel.

FIG. 8 is a sectional view of the third embodiment taken along a plane containing the optical axis.

(Optical System)

Since an optical system of this embodiment is the same as that in the first embodiment, a description thereof will be omitted.

(Structure)

Only a difference in structure from the first embodiment will be described below. The same reference numerals denote the parts common to those in the first embodiment.

A switching ring 30 is threadably engaged with the inner circumferential surface of a central outer peripheral portion 1h of a stationary lens barrel 1 by helicoidal screws 1j and 30a. An internal gear 30b and a groove portion 30c are formed on the inner circumferential surface of the switching ring 30 over the entire circumference. The internal gear 30b is meshed with a small gear 15e, and an elongated portion 19a of a first clutch plate 19 is fitted in the groove portion 30c.

Figure 9:
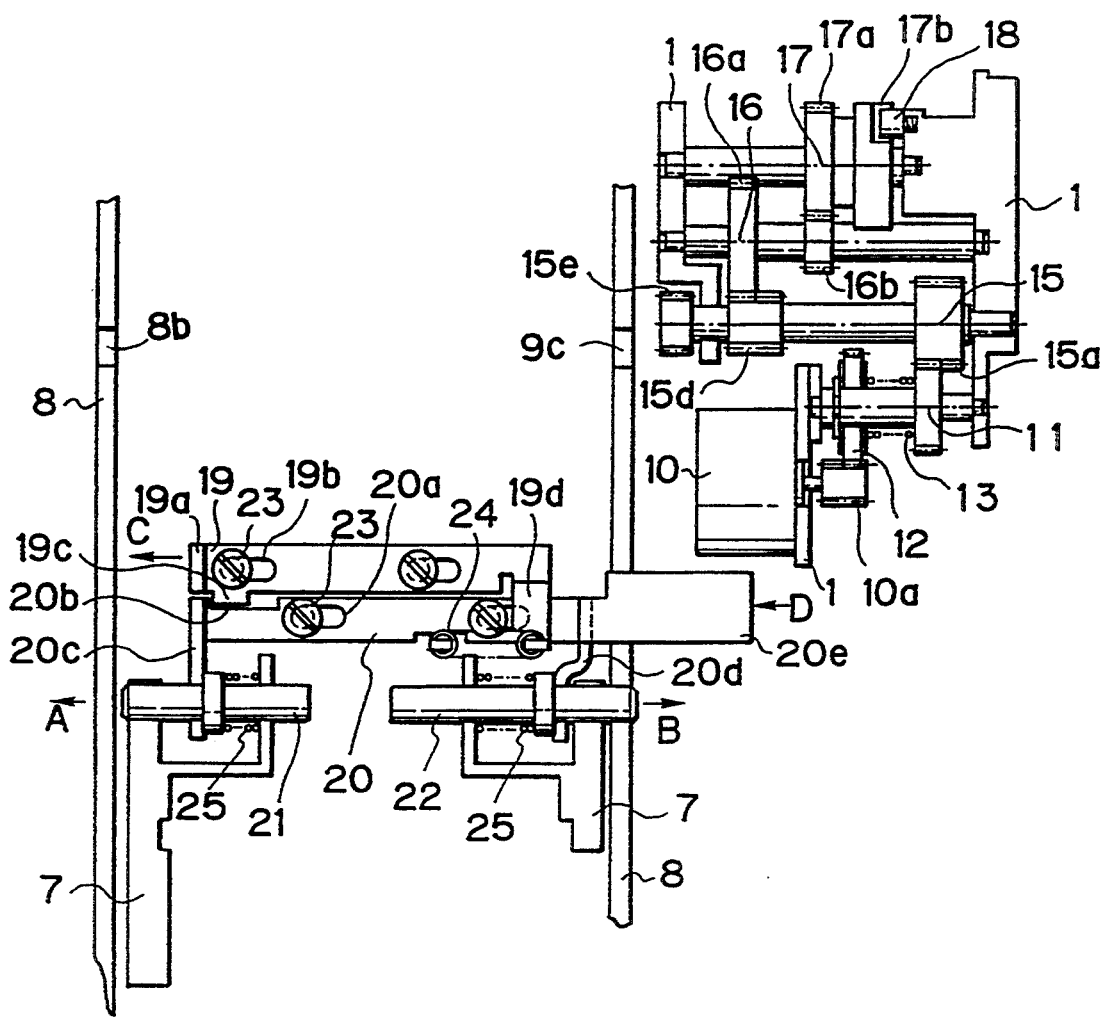
FIG. 9 is a sectional view of a switching apparatus of the third embodiment.

FIG. 9 is a sectional view of a switching apparatus according to the third embodiment of the present invention.

The structures of a drive motor 10, gears 11 and 12, a compression spring 13, gears 15, 16, and 17, a rotation limit pin 18, and the like are the same as those in the first embodiment. In the third embodiment, however, these components are arranged on the inner circumferential surface of the central outer peripheral portion 1h of the stationary lens barrel 1.

The operation of this embodiment will be described below.

In this embodiment, substantially the same operation as in the first embodiment is performed except for a moving method of the first clutch plate 19. More specifically, when the drive motor 10 is rotated, the gear 15 is rotated through a gear 10a, and the gears 12 and 13, and the switching ring 30 is rotated through the gear 15e and the internal gear 30b. The switching ring 30 is moved in the optical axis direction by the helicoidal screws 30a and 1j. Since the elongated portion 19a of the first clutch plate 19 is fitted in the groove portion 30c of the switching ring 30, the first clutch plate 19 is moved integrally with the switching ring 30 in the optical axis direction.

(Advantages)

According to the first embodiment, when the switching ring 4 is rotated, the photographing mode can be switched between the MF and AF modes, and the drive motor 10 is rotated to easily switch between the auto-focusing apparatus and the manual focusing apparatus.

Since the motor is used as the power source, current consumption can be reduced to about 1/100 as compared to a solenoid, and hence, consumption of a battery is low, resulting in an economic apparatus.

According to the second embodiment, the same effect as in the first embodiment can be provided. In addition, since the number of members rotated together with the cam ring 7 can be reduced, a drive load in the AF mode can be decreased, and a time required for an AF operation can be shortened, thus allowing a quick photographing operation. Since current consumption can be further reduced due to the small drive load and the short drive time, battery consumption can be further reduced, resulting in a more economic apparatus.

According to the third embodiment, the same effects as in the first and second embodiments can be provided. In addition, since the drive motor 10 is fixed to the stationary lens barrel 1, a motor drive power supply can be directly performed. Therefore, a stable power supply can be assured, and a switching operation between the auto-focusing apparatus and the manual focusing apparatus can be reliably performed. Since the power supply can be directly performed, the number of electrical parts can be reduced, resulting in low manufacturing cost.

According to the present invention, a motor is used as a drive power source for driving a switching apparatus for switching between the auto-focusing apparatus and the manual focusing apparatus. When a photographer supplies an external electrical signal, the electrical signal is supplied to the motor, the motor is rotated, and a switching operation from the auto-focusing apparatus to the manual focusing apparatus and vice versa can be performed according to the forward/reverse rotational direction of the motor. Thus, various methods of supplying an electrical switching signal can be selected.

When a photographing operation for an object which is not easy to focus or an intentional out-of-focus photographing operation is performed during an AF photographing operation, the photographing mode can be quickly switched to the MF mode. In a "go home" photographing function in the MF mode, a "go home" switch is depressed to temporarily select the AF mode, a focusing lens is moved to a preset position, and thereafter, the photographing mode is returned to the MF mode.

What is claimed is:

1. A lens barrel including: selection means, which is operable to select one of a manual focusing mode and an auto-focusing mode, for outputting an electrical signal according to an operation;
   a focusing optical system;
   a holding cylinder for holding said focusing optical system, and moving said focusing optical system along an optical axis to perform a focusing operation;
   a cam cylinder for moving said holding cylinder;
   manual operation means, which is externally operable, for driving said cam cylinder by an external operation;
   auto-focusing drive means;
   automatic operation means, which is driven by said auto-focusing drive means, for driving said cam cylinder by a drive operation;
   clutch means, which is displaceable between first and second positions, for coupling said cam cylinder and said manual operation means when said clutch means is located at the first position, and for coupling said cam cylinder and said automatic operation means when said clutch means is located at the second position;
   clutch drive means, including a rotary electric motor, for displacing said clutch means to one of the first and second positions by a rotational drive force of said rotary electric motor in one rotational direction and for displacing said clutch means to the other of said first and second positions by a rotational drive force of said rotary electric motor in an opposite rotational direction;
   control means responsive to said electrical signal of said selection means for, when the manual focusing mode is selected by said selection means, operating said electric motor in a rotational direction that causes said clutch drive means to displace said clutch means to the first position, and for, when the auto-focusing mode is selected by said selection means, operation said rotary electric motor in a rotational direction that causes said clutch drive means to displace said clutch means to the second position; and
   detection means for detecting that said manual operation means is operated, and
   wherein when said detection means detects an operation of said manual operation means when the auto-focusing mode is selected, said control means operates said rotary electric motor in a rotational direction that causes said clutch drive means to automatically displace said clutch means to the first position.

2. A lens barrel according to claim 1, wherein said clutch drive means includes a first drive system for electrically displacing said clutch means to one of the first and second positions by the drive force of said rotary electric motor, and a second drive system, arranged independently of the first drive system, for mechanically displacing said clutch means to one of the first and second positions without using said rotary electric motor.

3. A lens barrel including:
   a selector which is operable to select one of a manual focusing mode and an auto-focusing mode, for outputting an electrical signal according to an operation;

a focusing optical system; a holding cylinder for holding said focusing optical system, and moving said focusing optical system along an optical axis to perform a focusing operation;

a cam cylinder for moving said holding cylinder;

a manual operator, which is externally operable, for driving said cam cylinder by an external operation;

an auto-focusing driver;

an automatic operator, which is driven by said auto-focusing driver, for driving said cam cylinder by a drive operation;

a clutch, which is displaceable between first and second positions, for coupling said cam cylinder and said manual operator when said clutch is located at the first position, and for coupling said cam cylinder and said automatic operator when said clutch is located at the second position;

a clutch driver, including a rotary electric motor, for displacing said clutch to one of the first and second positions by a rotational drive force of said rotary electric motor in one rotational direction and for displacing said clutch to the other of said first and second positions by a rotational drive force of said rotary electric motor in an opposite rotational direction;

a controller responsive to said electrical signal of said selector for, when the manual focusing mode is selected by said selector, operating said electric motor in a rotational direction that causes said clutch driver to displace said clutch to the first position, and for, when the auto-focusing mode is selected by said selector, operating said rotary electric motor in a rotational direction that causes said clutch driver to displace said clutch to the second position; and a detector for detecting that said manual operator is operated, and wherein when said detector detects an operation of said manual operator when the auto-focusing mode is selected, said controller operates said rotary electric motor in a rotational direction that causes said clutch driver to automatically displace said clutch to the first position.

4. A lens barrel according to claim 3, wherein said clutch driver includes a first drive system for electrically displacing said clutch to one of the first and second positions by the drive force of said rotary electric motor, and a second drive system, arranged independently of the first drive system, for mechanically displacing said clutch to one of the first and second positions without using said rotary electric motor.

* * * * *